United States Patent Office 3,358,226
Patented Dec. 12, 1967

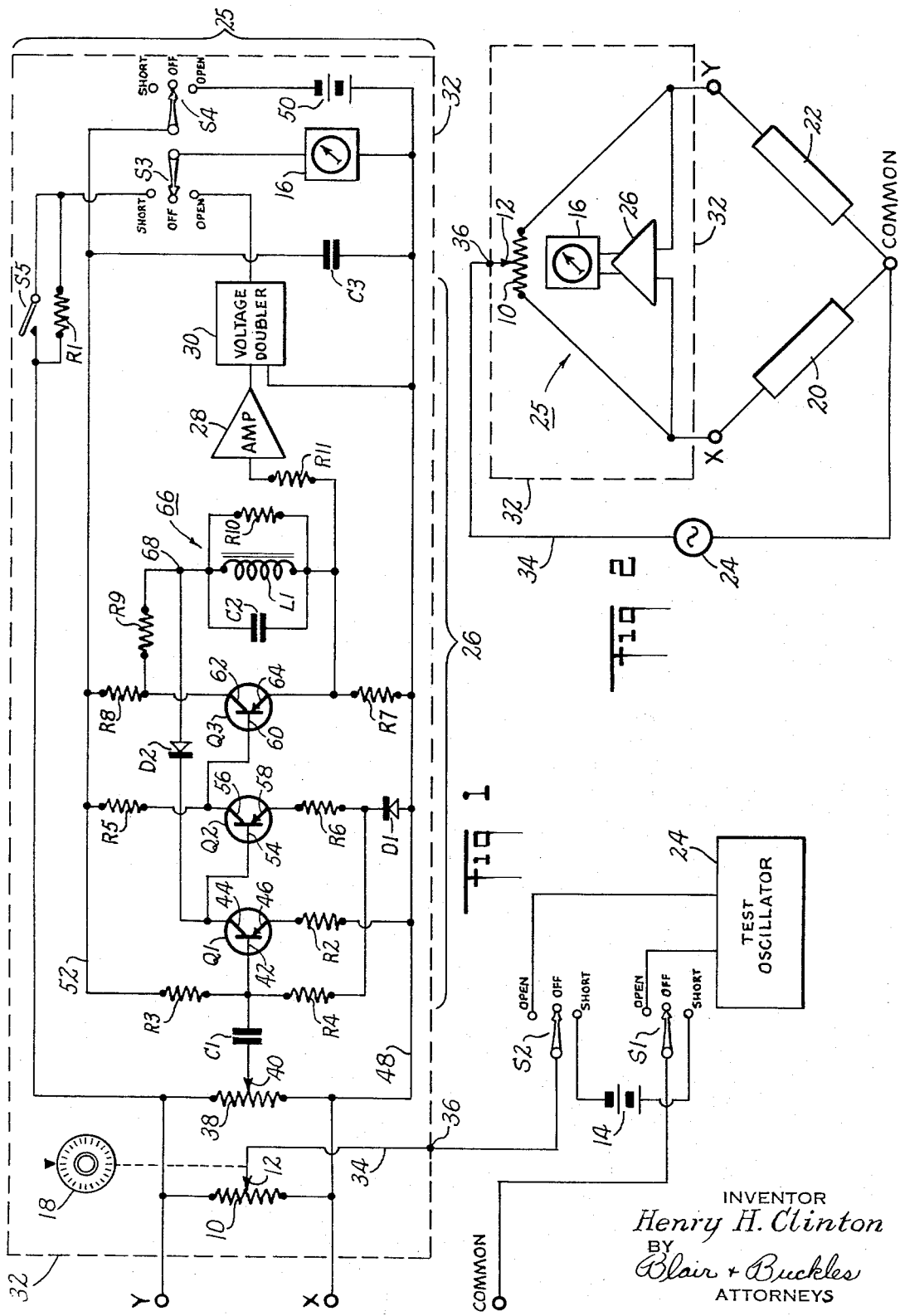

3,358,226
CABLE FAULT LOCATOR EMPLOYING SHIELDED TUNED AMPLIFIER CIRCUITRY
Henry H. Clinton, Clinton, Conn., assignor to The Whitney Blake Company, New Haven, Conn.
Filed June 14, 1963, Ser. No. 288,038
7 Claims. (Cl. 324—52)

This invention relates to electrical test equipment. More specifically, it relates to an instrument for locating faults in multi-conductor electrical cables. The instrument is particularly suited for use in the field to locate a fault in a cable while the unfaulted conductors in the cable remain in use.

The instrument, termed a fault locator, has a source for energizing a faulted cable with a test signal. A sensing unit in the fault locator receives the test signal through the faulted conductor. In response, the sensing unit provides information from which the fault is readily located with high accuracy. The fault locator of the present invention incorporates novel shielding to preclude stray test signals, such as those capacitively coupled from the fault locator to the earth or other adjacent conducting members, from developing an erroneous signal at the input of the sensing unit. As a result, the sensing unit receives the test signal only through the conductors under test. This operation makes possible reliable fault location with high accuracy. Moreover, the novel shielding arrangement enhances the operation of the fault locator.

According to another feature of the invention, the sensing unit incorporates a novel tuned circuit that responds only to signals at the frequency of the test signal. The tuned circuit rejects from the sensing unit all unwanted signals present in the conductors being tested. By thus eliminating potential measuring errors caused by signals other than the test signal, the novel tuned circuit enhances the accuracy of the fault locator and facilitates its operation.

A novel temperature compensating circuit is also provided in the sensing unit to maintain accurate operation over a wide range of environmental temperatures as encountered during field testing, especially with a portable fault locating instrument. Electrical components having temperature invariant characteristics are generally markedly more costly than components whose characteristics vary with temperature. The temperature compensation of the present invention allows low-cost temperature sensitive components to be used in the fault locator without detracting from its reliability and accuracy.

When a fault in an installed electrical cable, such as a power cable or multi-conductor telephone communication cable, is not located with high accuracy, the cable must be cut open many times in an effort to "zero in" on the fault. This is a costly and time consuming task. Hence, it is desirable that fault locating equipment function with the highest accuracy as well as without interrupting service on the good conductors in the faulted cable. Moreover, the equipment should be usable in substantially all weather conditions to enable faults to be located as soon as possible after they develop. However, humidity and temperature changes generally result in substantial changes in the resistance and capacitance of circuit components and in other parts, such as a wooden case, of portable electrical instruments. These changes tend to adversely affect the accuracy of the instrument's operation.

In general, to locate a fault, instruments of the present type apply a test signal to conductors in the cable. The test signal coupled through the faulted conductor to the locator's sensing unit provides information from which the fault location is calculated.

Substantial measuring errors result when the sensing unit receives spurious test signals via a path other than through the faulted conductor, as through ground loops capacitively coupled between the cable and the instrument. Even small percentage errors caused by such spurious test signals can result in fault locating errors in the order of hundreds of feet when working with long cables. The prior art has often resorted to compensating circuits to cancel the spurious test signals that develop at the input of the sensing unit. Such compensating circuits are generally difficult to operate. In addition, attempts have been made to shield the sensing unit from the spurious test signals. However, the leakage of spurious test signals through the prior art shielding has caused substantial measuring errors.

Obtaining accurate measurements for locating faults in multi-conductor cables, such as communications cables, is further complicated by the presence of message signals and 60 cycle pick-up signals on the good conductors in the cable. Cross talk, between these good conductors in service and the conductors being tested, couples a portion of the message signals into the conductors under test. As a result, signals other than the test signal are present in the conductors under test and are applied to the input of the sensing unit. The response of the sensing unit to these coupled message signals introduces further error into the measurement.

Accordingly, it is an object of the present invention to provide an improved test instrument for locating faults in electrical cables. A further object is to provide such a fault locator that is easy to use and that provides reliable, accurate measurements.

Another object of the invention is to provide a cable fault locator in which the sensing unit receives the test signal only from the conductors being tested. Thus, it is an object of the invention to provide a fault locator in which the measurements are responsive only to the test signal applied to the sensing unit through the conductors under test.

Another object of the invention is to provide a cable fault locator in which the sensing unit is unaffected by signals in the cable other than the test signal.

A further object of the invention is to provide an improved tuned amplifier, operable only at a selected frequency or narrow range of frequencies, for use in cable test equipment.

It is also an object of the invention to provide an improved temperature compensating circuit for use in an amplifier of the above character.

Other objects of the invention will in part be obvious and will in part appear hereinafter.

The invention accordingly comprises the features of construction, combination of elements, and arrangements of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

FIGURE 1 is a schematic diagram, partly in block form, of a cable fault locator embodying the invention; and FIGURE 2 is a simplified schematic representation of the fault locator of FIGURE 1 when connected with a faulted cable.

The present fault locator is particularly suited for connection with an electrical cable to form a four-arm bridge circuit therewith. The locator comprises an electrical source for exciting the bridge circuit and a sensing unit for indicating the magnitude of the bridge unbalance. A calibrated voltage divider in the fault locator forms two arms of the bridge circuit. Three terminals on the fault locator are generally connected with three conductors of the cable so that the cable forms the remaining two arms of the bridge circuit. When the bridge circuit thus formed is balanced by adjusting the voltage divider tap, a scale coupled with the voltage divider tap indicates the ratio of a first cable impedance that includes the section of faulted conductor between the fault and the fault locator to a second cable impedance that includes the entire faulted conductor. A second measurement is then made with different connections to provide a second impedance ratio involving the same section of the faulted conductor and the entire faulted conductor. These two ratios are then combined to provide the impedance of the section of faulted conductor between the fault and the fault locator to the impedance of the entire faulted conductor. This ratio is readily converted to the length of the cable between the locator and the fault. The fault locator can be used to locate both open circuit faults and short circuit faults. However, the features of the present invention are directed particularly to locating open circuits and other high impedance faults in a cable.

For this operation, in the illustrated embodiment of the invention, the electrical source is an oscillator developing an alternating test signal, and the sensing unit comprises an AC amplifier connected with a suitable indicator, such as a meter. For operating ease and portability, the source and sensing unit are generally housed in one case.

A novel shielding arrangement, wherein a shield associated with the sensing unit is connected to one output terminal of the oscillator, isolates the sensing unit from the oscillator for preventing spurious test signals from being coupled to the amplifier. By thus isolating the amplifier input terminals from stray capacitive paths that tend to introduce spurious test signals to the sensing unit, the amplifier only receives the test signal through the faulted conductor. As a result, the fault locator provides accurate fault location without the unsatisfactory compensation tuning adjustments, or other techniques, used in prior art locators to compensate for the presence of spurious test signals.

The invention also provides a novel tuned amplified circuit for the sensing unit of the fault locator. The tuned amplifier has a narrow band width centered at the frequency of the test signal and is substantially free of other pass bands over a broad range of frequencies. Hence, the sensing unit responds only to signals having the same frequency as the test signal, which is selected to differ from the frequency of the communication and other signals present in the cable.

The tuned amplifier is suitably constructed with two amplifier stages and a single frequency dependent network that simultaneously changes the gain of both stages as the signal frequency varies. One stage is connected in a novel manner with a feedback network having a tuned circuit and providing minimum degenerative feedback at the frequency of the test signal. As a result, the amplifier stage has maximum gain at the test signal frequency. The feedback signal increases substantially at other frequencies, causing the amplifier gain to drop markedly. The tuned circuit of the feedback network provides the second amplifier stage with a load impedance that has maximum value at the frequency of the test signal and a substantially lower impedance at other frequencies. Accordingly the gain of the second amplifier stage also is high only at the selected frequency of the test signal.

A further feature of the present fault locator is a novel temperature compensating circuit that makes it possible for the sensing unit to utilize low cost, temperature sensitive components and yet remain operative with high accuracy over practically all environmental temperatures encountered in field testing.

Numerous methods for using the present fault locator are disclosed in two pending United States patent applications assigned to the assignee of this application and identified by Ser. No. 784,709 filed Jan. 2, 1959, now Patent No. 3,234,459, and Ser. No. 210,960 filed July 19, 1962, now Patent No. 3,248,646. Although the present fault locator is different from the fault locating equipment described in these pending applications, it is designed for use in the manner they disclose.

Turning now to the diagram of the fault locator shown in FIGURE 1, a cable (not shown) is connected to the fault locator at a Y terminal, an X terminal, and a COMMON terminal. A voltage divider 10, having an adjustable tap 12, is connected between the X and Y terminals. With these connections, the portion of the voltage divider 10 on each side of the tap 12 forms one arm of a four-arm bridge circuit and the cable under test forms the remaining two arms.

To locate resistive faults in the cable, such as a short circuit or other relatively low resistance between two conductors in the cable, switches S1, S2, S3 and S4, preferably ganged together for unitary operation, are set to the "SHORT" position. With this setting, the switches S1 and S2 connect a battery 14 between the COMMON terminal and the voltage divider tap 12 to energize the bridge circuit. The switch S3 connects a meter 16 between the X and Y terminals to indicate the magnitude of the bridge unbalance. The tap 12 on the voltage divider 10 is then adjusted to provide a null or minimum indication on the meter 16. At balance, where the indication of the meter 16 is minimum, the reading on a scale 18 coupled with the voltage divider tap 12 is recorded for use in computing the location of the cable fault as discussed in detail in the pending applications identified above. As described in these applications, the measurement compares an impedance of the section of the faulted conductor between the fault and the test set to the impedance of the entire faulted conductor.

A resistor R1, connected in parallel with a switch S5, is preferably provided in series between the Y terminal and the meter 16. When the fault locator is initially connected as described above, the voltage divider is adjusted for minimum indication on the meter 16 with the switch S5 open. The resistor R1 is then in series with the meter 16 and substantially decreases the fault locator sensitivity, preventing the meter 16 from being damaged when the bridge circuit is far out of balance. When a null condition is obtained in this manner, the switch S5 is closed, short circuiting the resistor R1 and thereby substantially increasing the sensitivity of the fault locator. A fine balance adjustment is then made with the voltage divider tap 12 to obtain a precise reading on the scale 18 corresponding to the fault location.

For locating open circuit, broken conductors, or other high impedance faults in a cable, the Y, X and COMMON terminals of the fault locator are again connected with the cable to form two arms, indicated in FIGURE 2 at 20 and 22, of a four-arm bridge circuit. The voltage divider 10 again forms the remaining two arms of the bridge circuit. The switches S1, S2, S3 and S4, shown only in FIGURE 1, are set to the "OPEN" position. With this setting, the bridge circuit is energized by the alternating voltage developed by a test oscillator 24 connected between the COMMON terminal and the tap 12 of the voltage divider 10. A sensing unit 25, comprising an amplifier 26 connected with the meter 16, receives the bridge unbalance voltage from between the X and Y terminals.

The amplifier 26 input voltage, developed across the X and Y terminals, is applied to a tuned amplifier circuit comprising the transistors Q1, Q2 and Q3. The amplifier signal is then applied to additional amplification stages 28 and to a voltage doubler 30 before being applied to the meter 16. The construction of the amplifier 26 will be discussed in detail hereinafter.

As seen in FIGURES 1 and 2, when the fault locator is thus set to locate open circuit or like faults in cable conductors, the test oscillator 24 is connected between the COMMON terminal and the voltage divider tap 12. The COMMON terminal usually is at earth potential when the locator is connected with a faulted cable. Therefore, stray capacitance from the X and Y terminals to earth or adjacent conducting objects is effectively shunted between the COMMON terminal and the X and Y terminals. This stray capacitance will couple a portion of the test generator signal from the COMMON terminal directly to the X and Y terminals, bypassing the bridge arms 20 and 22, FIGURE 2. These spurious test signals developing between the X and Y terminals will introduce an erroneous bridge unbalance voltage. As a result, the reading obtained on the scale 18 when the bridge is balanced is not responsive to only the test signal coupled to the X and Y terminals through the cable conductors connected as the bridge arms 20 and 22. Hence, an erroneous fault location will be obtained. These difficulties are usually compounded when the source 24 and sensing unit 25 are housed in a single case. The manner in which this vexing problem is removed according to the present invention will now be described.

As shown in FIGURES 1 and 2, a conductive shield 32 for electric fields and associated with the sensing unit 25 is suitably arranged to electrically isolate the sensing unit from the oscillator 24. The shield 32 may completely enclose the sensing unit 25 or may only need to be arranged intermediate the sensing unit and the oscillator 24, depending on the manner in which the sensing unit and the oscillator are packaged in the fault locator instrument. The shield 32 is electrically connected at 36 to the conductor 34 interconnecting the voltage divider tap 12 with the switch S2. When the switch S2 is in the OPEN position to connect with the oscillator 24, this connection 36 maintains one output terminal of the oscillator 24 connected directly to the shield 32.

As best seen in FIGURE 2, with one terminal of the oscillator 24 thus directly connected to the sensing unit 25, at the tap 12, and connected also to the shield 32, it has been found that there is no measurable capacitance between the COMMON terminal and either the X or the Y terminal. Accordingly, the bridge unbalance voltage is determined solely by the test signal coupled through the bridge arms 20 and 22. The shielding arrangement of the invention provides this result even when the entire fault locator shown in FIGURE 1 is constructed in a single portable case.

Turning now to the construction of the sensing unit 25, shown in FIGURE 1, the voltage between the X and Y terminals (such as the bridge unbalance voltage derived with the fault locating connections shown in FIGURE 2) is applied across the ends of a voltage divider 38. A tap 40 on the voltage divider is operable as a gain control to adjust the portion of the sensing unit input voltage applied to the amplifier 26.

A transistor Q1, having a base terminal 42, a collector terminal 44 and an emitter terminal 46, is connected in a common emitter circuit with a resistor R2 in series between the emitter terminal 46 and a conductor 48 extending between the X terminal and a battery 50. When the switch S4 is set to the "OPEN" position the battery 50 applies the transistor operating voltage between the conductor 48 and a conductor 52.

A resistor R3 is connected in series with the series combination of a resistor R4 and a diode D1 between the conductors 48 and 52. The transistor Q1 base terminal 42 is connected to the junction of the resistors R3 and R4 to provide the transistor with the desired base bias condition. A blocking capacitor C1 is connected between the voltage divider tap 40 and the base terminal 42 to apply the input signal from the tap 40 to the base terminal of the transistor Q1.

The resistors R3 and R4 and, in the manner detailed below, the diode D1 establish the bias conditions for the transistor Q1 and the resistor R2 provides the transistor's emitter load. The DC path from the battery 50 to the collector terminal 44 is through the Zener diode D2 and the series-connected resistors R8 and R9. The diod D2 conducts on its Zener characteristic and provides a uniform voltage drop for biasing purposes.

In the illustrated embodiment of the invention the transistor Q1 is a pnp transistor, in which the collector current increases when the voltage at the base terminal 42 becomes more positive with respect to the collector terminal 44. The input signal to the transistor Q1 is applied to the base terminal 42 and the amplified output signal is developed at the collector terminal 44. The transistor suitably provides a gain of 100 that is sharply reduced, in the manner explained below, at the frequencies other than the frequency of the test oscillator 24.

A transistor Q2, having a base terminal 54, a collector terminal 56 and an emitter terminal 58, is connected in a common emitter circuit with a resistor R5 connected between its collector terminal 56 and the conductor 52. A resistor R6 is connected between the transistor Q2 emitter terminal 58 and the diode D1. The input signal to the transistor Q2, which like the transistor Q1 operates as an amplifier, is directly coupled from the transistor Q1 collector terminal 44 to the base terminal 54 of the transistor Q2.

The resistor R5 and the resistor R6, connected through the diode D1, determine the operating characteristics of the pnp transistor Q2. At the frequency of the test oscillator 24, the transistor Q2 receives minimum degenerative feedback from the transistor Q3. The transistor Q2 then suitably has a maximum gain slightly less than 10.

The output signal from the transistor Q2 is directly coupled to the base terminal 60 of a transistor Q3 having a collector terminal 62 and an emitter terminal 64. Equal-valued resistors R7 and R8 are connected respectively between the transistor Q3 emitter terminal 64 and the conductor 48 and the transistor's collector terminal 62 and the conductor 52. With this connection, the transistor Q3 operates as a phase inverter, developing equal and opposite voltages at its collector and emitter terminals 62 and 64 respectively.

The series combination of a resistor R9 and a parallel resonant circuit 66, comprising a capacitor C2, an inductor L1, and a resistor R10, are connected between the collector and emitter terminals of the transistor Q3. The output signal from the transistor Q3 is applied through a resistor R11 to additional stages 28 of conventional amplification and thence to a voltage doubler 30 that is connected with the meter 16.

A Zener diode D2 is connected from the connection 68 of the resistor R9 and the resonant circuit 66 to base terminal 54 of the transistor Q2 and to the collector terminal 44 of the transistor Q1.

The operation of the transistors Q1, Q2 and Q3 of the sensing unit 25 to provide high gain at the 100 cycle frequency of the test signal oscillator 24 and low gain at other frequencies will now be described with reference to FIGURE 1. Considering first the phase inverter transistor Q3 and the resistor R9 and resonant circuit 66 connected therewith, when the impedance of the resonant circuit 66 is equal to the resistance of the resistor R9, the A.C. voltage at the connection 68 is zero. At this condition, there is no feedback from the connection 68 through the Zener diode D2 to the transistor Q2.

When the impedance of the tuned circuit 66 is less than the resistance of the resistor R9, the voltage at the connection 68 is 180° out of phase with respect to the transistor Q2 input signal. Hence the diode D2, conducting on its Zener characteristic between the connection 68 and the Q2 base input terminal 64, applies negative, or degenerative, feedback to the transistor Q2, markedly decreasing the gain of the transistor.

The tuned circuit 66 is constructed to be parallel resonant at 100 cycles per second, the frequency of the test oscillator 24, and to have a resonant impedance slightly lower than the resistance of the resistor R9. Hence the feedback path through the diode D2 from the connection 68 applies a small degenerative feedback to the transistors Q1 and Q2 at the test signal frequency. At frequencies removed from this test frequency, the impedance of the circuit 66 rapidly drops to substantially lower values, markedly increasing the magnitude of the degenerative feed-back signal applied to the transistor Q2. In this manner, the transistor Q2 receives minimum negative feedback and correspondingly has high gain only at the test frequency of the oscillator 24. The negative feedback from the transistor Q3 to Q2 also stabilizes the DC bias of the transistor Q2.

The AC collector load for the transistor Q1 consists in large part of the resonant circuit 66 and the resistors R7, R8 and R9 associated with the transistor Q3. The transistor Q2 and its associated resistor R6 present a relatively high impedance in parallel with the above impedance elements and do not affect the operation described below.

At the frequency of test oscillator 24, the tuned circuit 66 is resonant and presents a high impedance to the collector of transistor Q1, enabling high gain to be realized with the transistor. At other frequencies, the tuned circuit 66 has a low impedance and presents a relatively low impedance to the transistor Q1 collector. As a result, the transistor Q1 provides high gain only at the frequency of the test oscillator 24.

It will now be seen that at the frequency of the test oscillator 24 the amplifier transistor Q1 has a high load impedance and that transistor Q2 amplifies with minimum degenerative feedback. Hence, high gain is realized at the test signal frequency. At other frequencies, the transistor Q1 load impedance is markedly reduced and the degenerative feedback applied to transistor Q2 is substantially greater, causing the gain in both transistors to be low. It should be noted that the change in impedance of the tuned circuit 66 with frequency controls the gain of both transistors Q1 and Q2. Hence, one feature of this circuit is that the gains realized in both transistors automatically vary in synchronism.

For the illustrative circuit parameters set forth below, the circuit comprising transistors Q1, Q2 and Q3 has a maximum gain at 100 cycles per second of slightly less than one thousand. The frequency response of the circuit is exceedingly sharp, so that the gain drops by 3 db (to half power) at frequencies removed by one and one-half cycles from the 100 c.p.s. frequency. With this performance, the amplifier 26 responds, in effect, only to input signals developed between the X and Y terminals having a frequency of 100 cycles per second. At other frequencies, the amplifier develops a relatively insignificant signal across the meter 16.

Since the transistors Q1, Q2 and Q3 are direct coupled, the large degenerative feedback signal is applied to the transistor Q2, and the transistor Q1 has a relatively low AC load, over an extremely broad range of frequencies. The result is that substantially all message and other signals in the cable being tested are precluded from developing a response in the meter 16.

The output signal from the circuit formed by transistors Q1, Q2 and Q3 is applied to the series resistor R11, to conventional amplification stages 28 and is then rectified, suitably with a voltage doubler indicated at 30, before being applied through the switch S3 to the meter 16.

With further reference to FIGURE 1, the transistor Q1 requires a voltage between its base and emitter terminals 42 and 46, respectively of 0.1 volt, for example, to develop a preselected collector current. However, as the temperature of the transistor Q1 decreases, this base to emitter voltage may go up to 0.2 volt before the same collector current exists. The diode D1 connected between the conductor 48 and the resistor R4 compensates for this temperature sensitive change in the characteristics of the transistor Q1.

The diode D1 operates forward biased developing a forward voltage drop that is impressed, by the resistors R4 and R2, between the emitter terminal 46 and the base terminal 42 of the transistor Q1. As the temperature of the diode decreases, the amplitude of the forward voltage drop increases, and provides the increased base to emitter voltage required by the transistor Q1 to maintain the same collector current. In this manner, the diode D1 compensates for temperature changes that would otherwise prevent the use of a low cost temperature sensitive transistor Q1.

Due to the coupling between the transistors Q1 and Q2, the effect on the transistor Q2 of the temperature compensation that the diode D1 applies to the transistor Q1 is substantially greater than the effect of connecting the diode in series with the transistor Q2 emitter terminal 58. Accordingly, it is not necessary that the diode D1 be connected in circuit with the transistor Q2.

The temperature compensating operation of the diode D1 is enhanced when it is suitably mounted and disposed to be at the same temperature as the transistor Q1. The diode D1 will then compensate for temperature changes due to the environment and due to heat generated in the transistor Q1.

A frequency selective circuit operating with the advantages set forth above can be constructed with the components designated below. It is to be understood that these values are presented only by way of illustration and the invention is in no manner limited to them.

| | | |
|---|---|---|
| Voltage divider 10 | ohms | 1K |
| Voltage divider 40 | do | 5K |
| R1 | do | 10K |
| R2 | do | 180 |
| R3 | do | 220K |
| R4 | do | 4.7K |
| R5 | do | 10K |
| R6 | do | 1K |
| R7 | do | 820 |
| R8 | do | 820 |
| R9 | do | 15K |
| R10 | do | 22K |
| R11 | do | 4.7K |
| C1 | microfarads | 50 |
| C2 | do | 0.47 |
| D1 | | 1N34 |
| D2 | volts Zener | 0.6 |
| Battery 60 | volts | 9 |

In summary, the shielding arrangement described above for cable fault locating equipment effectively prevents alternating voltages from being capacitively coupled to the locator's sensing unit. This achievement makes it relatively easy to perform accurate and reliable fault location measurements, thereby markedly reducing the time and cost required to locate cable faults.

The construction and operation of the fault locator is enhanced substantially by the temperature compensated tuned amplifier disclosed above. The gain control provided for both stages of the amplifier by the single tuned circuit not only provides a sharp response characteristic, but also automatically synchronizes the gain for both stages. This enables the composite amplifier to achieve the sharp response characteristic with a simple low cost circuit and without adjustments. The temperature compensating diode combined with the transistor of the first amplifier stage stabilizes the amplifier operation over the wide range of environmental temperatures encountered with portable field testing equipment, and allows the use of relatively low cost components in the amplifier of the fault locator.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

Having described the invention, what is claimed as new and desired to be secured by Letters Patent is:

1. A multiconductor cable fault-locating apparatus comprising, in combination:
    (A) first, second, and third terminals for connection in circuit with a faulted cable,
    (B) a variable voltage divider having end terminals and a movable tap therebetween, said end terminals being connected to said first and second terminals,
    (C) an AC test signal source having a pair of output terminals, one of said source output terminals connected to said third terminal and the other to said tap,
    (D) a sensing unit including
        (1) a first electronic amplifier having an input terminal and an output terminal,
        (2) feedback means having first and second terminals,
            (a) said feedback means being connected in circuit with said amplifier output terminal, and
            (b) responding to the amplifier output signal to develop at said first and second terminals, respectively, voltages of equal magnitude and opposite polarity,
        (3) a circuit element having a frequency independent impedance,
        (4) a circuit device having a frequency dependent impedance,
            (a) said element and said device being connected in series between said first and second terminals of said feedback means,
            (b) the common connection between said element and said device connected in circuit with said amplifier input terminal to provide a degenerative feedback signal effective to substantially decrease the gain of said first amplifier at frequencies other than the frequency of said test signal, and
        (5) a second electronic amplifier having an input terminal and an output terminal,
            (a) said second amplifier output terminal being connected in circuit with said first amplifier input terminal and said frequency dependent circuit device,
            (b) said frequency dependent circuit device providing a decreasing load impedance for said second amplifier at frequencies other than said test signal frequency.

2. In cable fault-locating apparatus for connection with a multiconductor electrical cable to receive an alternating test signal coupled through a fault in the cable, a frequency selective amplifier circuit to which the received test signal is applied, said circuit comprising in combination:
    (A) a first electronic amplifier having an input terminal and an output terminal,
    (B) feedback means having first and second terminals,
        (1) said feedback means being connected in circuit with said amplifier output terminal, and
        (2) responding to the amplifier output signal to develop at said first and second terminals, respectively, voltages of equal magnitude and opposite polarity,
    (C) a circuit element having a frequency independent impedance, and
    (D) a circuit device having a frequency dependent impedance,
        (1) said element and said device being connected in series between said first and second terminals,
        (2) the common connection between said element and said device being connected in circuit with said amplifier input terminal,
        (3) said element and said device applying to said amplifier input terminal a degenerative feedback signal having minimum value at the frequency of the test signal and a substantially greater value at other frequencies so that said first electronic amplifier has maximum gain at the test frequency,
    (E) a DC bias source,
    (F) a second electronic amplifier in the form of a semiconductor valve having third, fourth, and fifth terminals,
        (1) said fifth valve terminal being connected in circuit with said first amplifier input terminal and with said frequency dependent circuit device,
        (2) said frequency dependent circuit device providing said valve with a high output impedance at the test signal frequency and a markedly lower impedance at other frequencies so that said valve also has maximum gain at the test signal frequency,
        (3) said valve being connected in circuit with said bias source and receiving at its terminals selected bias signals,
        (4) said valve requiring, to develop a constant-level signal in said fifth terminal, a bias voltage between said third and fourth valve terminals that varies with temperature, and
    (G) a semiconductor element that conducts with a voltage drop that is relatively independent of current and dependent on temperature,
        (1) said element connected in circuit between said third terminal and said source,
        (2) so that said temperature dependent voltage drop changes the bias voltage between said third and fourth valve elements to maintain a constant level signal in said fifth valve terminal as the temperature of said valve changes.

3. A multiconductor cable fault-locating apparatus comprising, in combination:
    (A) first, second, and third terminals for connection in circuit with a faulted cable,
    (B) a variable voltage divider having end terminals and a movable tap therebetween, said end terminals being connected to said first and second terminals,
    (C) an A.C. test signal source having a pair of output terminals, one of said source output terminals connected to said third terminal and the other to said tap,
    (D) a sensing unit including
        (1) a first transistor having base, collector, and emitter terminals connected as a common emitter amplifier,
        (2) a second transistor having base, collector, and emitter terminals connected as a common emitter amplifier,
            (a) the base terminal of said second transistor being directly coupled with the collector terminal of said first transistor,
        (3) a third transistor having base, collector, and emitter terminals,
            (a) the base terminal of said third transistor being directly coupled with the collector terminal of said second transistor,
        (4) first and second equal-valued resistors connected respectively with the collector and emitter terminals of said third transistor,
        (5) a third resistor,
        (6) a tuned circuit having maximum impedance at the frequency of the test signal, (a) said tuned circuit and said third resistor being connected in series between the collector and emitter terminals of said third transistor, and
(7) feedback means connecting the junction between said tuned circuit and said third resistor to the collector terminal of said first transistor and the base terminal of said second transistor,
(a) so that said first transistor has a maximum output impedance at said selected frequency, and
(b) said second transistor receives, at the test signal frequency, minimum degenerative feedback from said junction,
(c) whereby the gains of said first and second transistors have a maximum value at the test signal frequency, and
(E) electric shield means capacitively isolating said sensing unit from said source and connected to said voltage divider tap.

4. Apparatus for locating faults in multiple conductor electrical cables, said apparatus comprising
(A) first, second and third terminals for connection in circuit with a faulted cable;
(B) a variable voltage divider having end terminals and a movable tap between the end terminals, said end terminals being connected to said first and second terminals;
(C) a source having a pair of output terminals and producing an alternating test signal therebetween, one of said source output terminals being connected to said third terminal and the other source output terminal being connected to said tap;
(D) a sensing unit including
(1) a first electrical amplifier
(a) having an input terminal in circuit with the voltage between said first and second terminals,
(b) having a pair of output terminals,
(c) responding to an input voltage to develop a corresponding voltage at said output terminals thereof,
(2) a resistive element,
(3) a parallel resonant circuit in series with said resistive element between said first amplifier output terminals, and
(4) a feedback element applying a degenerative feedback signal from the interconnection of said resistive element and said resonant circuit to said input terminal of said first amplifier, and
(5) a second electrical amplifier interposed between said first and second terminals and said first amplifier input terminal and arranged to apply an amplified function of the voltage between said first and second terminals to said first amplifier input terminal, and
(6) said resonant circuit being in circuit with the output of said second amplifier to form at least part of the electrical load thereof, and
(E) electric shield means capacitively isolating said sensing unit from said source and electrically connected to said voltage divider tap.

5. The apparatus defined in claim 4 wherein said sensing unit further includes
(1) a DC bias source,
(2) said further amplifier circuit comprises a semiconductor valve having third, fourth, and fifth terminals,
(a) said valve being connected in circuit with said bias source and receiving at its terminals selected bias voltages,
(3) a semiconductor element that conducts with a voltage drop that is relatively independent of current and dependent on temperature,
(a) said element connected in circuit between said third terminal and said bias source,
(b) so that said temperature dependent voltage drop changes the bias voltage between said third and fourth valve terminals to maintain a constant level signal at said fifth valve terminal as the temperature of said valve changes.

6. In cable fault-locating apparatus for connection with a multiconductor electrical cable to receive an alternating test signal capacitively coupled through a fault in the cable, a tuned amplifier to which the received test signal is applied, said amplifier actuating output means in response to the received test signal and comprising in combination
(A) a first transistor having base, collector, and emitter terminals and being connected as a common emitter amplifier,
(B) a second transistor having base, collector, and emitter terminals and being connected as a common emitter amplifier,
(1) the base terminal of said second transistor being direct coupled with the collector terminal of said first transistor so that said second transistor receives as an input signal the amplified output signal from said first transistor,
(C) a third transistor having base, collector and emitter terminals,
(1) the base terminal of said third transistor being direct coupled with the collector terminal of said second transistor to receive the output signal from said second transistor,
(D) first and second equal-valued resistors connected respectively with the collector and emitter terminals of the third transistor so that said third transistor develops equal and opposite voltages at its collector and emitter terminals in response to the signal it receives from said second transistor,
(E) a third resistor,
(F) a tuned circuit having maximum impedance at the frequency of the test signal,
(1) said tuned circuit and said third resistor being connected in series between the collector and emitter terminals of said third transistor, and
(G) feedback means connecting the common connection between said tuned circuit and said third resistor with the collector terminal of said first transistor and the base terminal of said second transistor
(1) so that said first transistor has a maximum output impedance at said selected frequency, and
(2) said second transistor receives at the test signal frequency, minimum degenerative feedback from the common terminal of said third resistor, and
(3) whereby the gains in said first and second grounded-emitter transistors have a maximum value at the test signal frequency and are markedly reduced at other frequencies.

7. The amplifier defined in claim 6 in which
(A) said first transistor is a germanium junction transistor,
(B) further comprising a DC bias voltage source.
(C) further comprising a resistive circuit connected with said bias source and with the base and emitter terminals of said first transistor to apply selected bias signals to said first transistor, and
(D) further comprising a germanium diode connected in circuit between a terminal of said bias source and the base terminal of said first transistor,
(1) said diode being forward biased during operation of said first transistor, and
(2) applying a temperature-varying forward voltage between the base and emitter terminals of said first transistor that compensates for temperature variations in the operating characteristics of said first transistor.

References Cited

UNITED STATES PATENTS

| | | | |
|---|---|---|---|
| 2,170,813 | 8/1939 | Doble et al. | 324—54 |
| 2,173,495 | 9/1939 | Schlesinger | 330—97 X |
| 2,189,849 | 2/1940 | Wheeler | 330—97 |
| 2,278,801 | 4/1942 | Rust et al. | 330—97 X |
| 2,329,098 | 9/1943 | Browning et al. | 324—54 |
| 2,940,051 | 6/1960 | Korn et al. | 330—27 |
| 3,001,145 | 9/1961 | Bradmiller | 330—29 X |
| 3,178,639 | 4/1965 | Hillman | 324—54 |
| 3,207,999 | 9/1965 | Carruth et al. | 330—25 X |
| 3,234,459 | 2/1966 | Brazee | 324—52 |
| 3,189,818 | 6/1965 | Frakes | 324—54 |

OTHER REFERENCES

Sulzer, Peter G., Junction Transistor Circuit Applications, Electronics, August 1953, pp. 170–172.

RUDOLPH V. ROLINEC, *Primary Examiner.*

WALTER L. CARLSON, *Examiner.*

G. R. STRECKER, *Assistant Examiner.*